United States Patent
Ilchenko et al.

(10) Patent No.: US 10,823,397 B2
(45) Date of Patent: Nov. 3, 2020

(54) BURNER ARRANGEMENT FOR HEATER

(71) Applicant: WEBASTO SE, Stockdorf (DE)

(72) Inventors: Volodymyr Ilchenko, Gilching (DE); Vitali Dell, Munich (DE); Martin Zoske, Weilheim (DE); Klaus Mösl, Sauerlach (DE)

(73) Assignee: WEBASTO SE, Stockdorf (DE)

( * ) Notice: Subject to any disclaimer, the term of this patent is extended or adjusted under 35 U.S.C. 154(b) by 1043 days.

(21) Appl. No.: 14/907,796

(22) PCT Filed: Jul. 3, 2014

(86) PCT No.: PCT/DE2014/100228
§ 371 (c)(1),
(2) Date: Jan. 26, 2016

(87) PCT Pub. No.: WO2015/014338
PCT Pub. Date: Feb. 5, 2015

(65) Prior Publication Data
US 2016/0169505 A1    Jun. 16, 2016

(30) Foreign Application Priority Data
Aug. 1, 2013   (DE) .................. 10 2013 108 254

(51) Int. Cl.
*F23D 11/08*    (2006.01)
*F23C 7/00*    (2006.01)
(Continued)

(52) U.S. Cl.
CPC ........... *F23C 7/002* (2013.01); *B60H 1/2212* (2013.01); *F23C 7/004* (2013.01); *F23C 7/06* (2013.01);
(Continued)

(58) Field of Classification Search
CPC ... F23D 3/40; F23C 7/06; F23C 7/004; B60H 1/2212
See application file for complete search history.

(56) References Cited

U.S. PATENT DOCUMENTS

| | | | | |
|---|---|---|---|---|
| 5,365,865 A | * | 11/1994 | Monro | F23D 1/02 110/264 |
| 5,707,227 A | * | 1/1998 | Langen | B60H 1/2203 237/12.3 C |
| 2005/0241319 A1 | * | 11/2005 | Graves | F23D 11/107 60/776 |

FOREIGN PATENT DOCUMENTS

| | | |
|---|---|---|
| CN | 102200279 A | 9/2011 |
| DE | 1501855 A1 | 6/1969 |

(Continued)

OTHER PUBLICATIONS

PCT International Search Report, PCT/DE2014/100228, dated Oct. 8, 2014.

*Primary Examiner* — Jason Lau
(74) *Attorney, Agent, or Firm* — Quarles & Brady LLP

(57) ABSTRACT

A burner arrangement (1), for a mobile heater operated with liquid fuel, is provided; having a combustion chamber (2) for converting fuel with combustion air in a flaming combustion, which combustion chamber (2) extends along a longitudinal axis (Z) in a main flow direction (H); a pre-mixing chamber (3), which is arranged fluidicly upstream of the combustion chamber (2), for generating a fuel-combustion air-mixture, which pre-mixing chamber (3) comprises a side wall (4); a fuel evaporation surface (O) arranged in the pre-mixing chamber; a fuel supply (10) for supplying liquid fuel; and a first combustion air supply (6) having a swirl body (7) for supplying a combustion air flow into the pre-mixing chamber (3) with a swirl such that the combustion air is guided along the fuel evaporation surface (O) with
(Continued)

a tangential flow component. A neck portion (5) is formed at a transition from the pre-mixing chamber (3) to the combustion chamber (2) at which the flow cross-section abruptly widens in the main flow direction (H).

10 Claims, 2 Drawing Sheets

(51) Int. Cl.
  *F23C 7/06* (2006.01)
  *F23D 5/12* (2006.01)
  *F23D 3/40* (2006.01)
  *B60H 1/22* (2006.01)
  *F23D 14/04* (2006.01)

(52) U.S. Cl.
  CPC ............... *F23D 3/40* (2013.01); *F23D 5/123* (2013.01); *F23D 14/04* (2013.01); *F23C 2202/40* (2013.01); *F23C 2900/03005* (2013.01); *F23D 2200/00* (2013.01); *F23D 2900/05002* (2013.01); *F23D 2900/14021* (2013.01); *F23D 2900/14241* (2013.01); *F23D 2900/21002* (2013.01)

(56) References Cited

FOREIGN PATENT DOCUMENTS

| | | |
|---|---|---|
| DE | 1918445 A1 | 10/1970 |
| DE | 4243712 C1 | 6/1994 |
| DE | 4401799 C1 | 6/1995 |
| DE | 10160655 A1 | 6/2003 |
| DE | 4447987 B4 | 3/2006 |
| EP | 1555482 A2 | 7/2005 |
| RU | 2206828 C1 | 6/2003 |
| RU | 48619 U1 | 10/2005 |
| WO | 2006056180 A1 | 6/2006 |

* cited by examiner

BURNER ARRANGEMENT FOR HEATER

CROSS-REFERENCE TO RELATED APPLICATIONS

This application represents the national stage entry of PCT International Application No. PCT/DE2014/100228 filed Jul. 3, 2014, which claims the benefit of German Patent Application 10 2013 108 254.8 filed Aug. 1, 2013, both of which are hereby incorporated herein by reference for all purposes.

The present invention relates to a burner arrangement for a mobile heater operated with liquid fuel, to a method for operating such a burner arrangement, to a mobile heater operated with liquid fuel having such a burner arrangement, and to a use of the burner arrangement.

In the present context, "mobile heater" is understood as a heater designed and correspondingly adapted for use in mobile applications. This means in particular that it can be transported (fixedly mounted in a vehicle or just accommodated there for transport, as the case may be) and is not only adapted for continuous stationary use, as would be the case for heating of a building. The mobile heater can be fixedly installed in a vehicle (land vehicle, boat, etc.), in particular in a land vehicle. In particular, it can be adapted for heating a vehicle interior, such as e.g. of a land vehicle, boat, or aircraft, as well as of a partly open room, as can e.g. be found on boats, in particular on yachts. The mobile heater can be temporarily used in stationary manner, such as e.g. in big tents, containers (e.g. containers for construction sites), etc. According to an advantageous further development, the mobile heater is adapted as a parking heater or auxiliary heater for a land vehicle, such as e.g. for a mobile home, a caravan, a bus, a passenger car, etc.

Mobile heaters are often used e.g. as vehicle heaters for heating a vehicle. In applications in a vehicle, such mobile heaters are e.g. used as auxiliary heaters which can provide additional heat while the propulsion engine of the vehicle is running or as parking heaters which can provide heat for heating purposes both when the propulsion engine is running and when it is at rest. The mobile heaters are typically operated with the same liquid fuel which is also used for a propulsion engine of the vehicle. Since e.g. depending on the time of the year or the regional use different liquid fuels can be employed (e.g. normal diesel, winter diesel or benzine and benzine with different percentages of ethanol, etc.), reliable conditioning of a fuel-combustion air-mixture often comes along with problems in the mobile heaters and e.g. building-up of deposits can arise in the region in which evaporation of the liquid fuel takes place.

It is an object of the present invention to provide an improved burner arrangement for mobile heaters operated with liquid fuel, a method for operating such a burner arrangement, and a mobile heater having such a burner arrangement.

The object is solved by a burner arrangement according to claim 1. Advantageous further developments are specified in the dependent claims.

The burner arrangement for a mobile heater operated with liquid fuel comprises: a combustion chamber for converting fuel with combustion air in a flaming combustion, which combustion chamber extends along a longitudinal axis in a main flow direction; a pre-mixing chamber, which is arranged fluidicly upstream of the combustion chamber, for generating a fuel-combustion air-mixture, which pre-mixing chamber comprises a side wall; a fuel evaporation surface arranged in the pre-mixing chamber; a fuel supply for supplying liquid fuel; and a first combustion air supply having a swirl body for supplying a combustion air flow into the pre-mixing chamber with a swirl such that the combustion air is guided along the fuel evaporation surface with a tangential flow component. A neck portion is formed at a transition from the pre-mixing chamber to the combustion chamber at which the flow cross-section abruptly widens in the main flow direction.

By the combination of the first combustion air supply with the swirl body and the pre-mixing chamber having the side wall, the combustion air flow supplied into the pre-mixing chamber is guided with a tangential directional component along the side wall of the pre-mixing chamber. Since the combustion air flow is thus guided over the fuel evaporation surface with a tangential flow component, a fuel-combustion air-mixture can reliably be generated. Such a high inlet velocity of the fuel-combustion air-mixture into the combustion chamber can be provided such that back-burning of a flame into the pre-mixing chamber is prevented. The premixing chamber is formed separate from the combustion chamber and a flame does not form in the pre-mixing chamber during regular heating operation of the burner arrangement. Since a neck portion is formed at the transition from the pre-mixing chamber to the combustion chamber, at which neck portion the flow cross-section abruptly widens, it is achieved that the swirl flow of the fuel-combustion air-mixture formed in the pre-mixing chamber strongly widens upon entering into the combustion chamber such that the axial flow component is strongly decelerated and a recirculation region forms along the longitudinal axis in a region close to the axis at a longitudinal axis in the combustion chamber. Here, in the region close to the longitudinal axis, gases flow oppositely to the main flow direction. The abrupt widening of the flow cross-section can be realized e.g. in form of a step-like widening of the cross-section, it is however also possible to realize the abrupt widening as a strong widening with an aperture angle of at least ≥20°, preferably ≥40°, more preferably ≥60°. The aperture angle is determined between the wall in the region of the abrupt widening and the longitudinal axis. In this manner, reliable flame stabilization and flame anchoring is achieved in the combustion chamber in which the flame remains stably positioned even at very different fuel-combustion air-mass flows. Thus, operation over a large band width of heating powers is enabled. The fuel supply may comprise exactly one fuel outlet or a plurality of fuel outlets can also be provided. A plurality of fuel outlets can e.g. in particular be arranged distributed over the circumference of the side wall. As far as the terms "radial", "axial" or "tangential" are used in the present context, these terms refer to the longitudinal axis of the combustion chamber in each case, as long as no other meaning is apparent from the respective context.

According to a further development, the fuel evaporation surface extends over at least a portion of the side wall and the fuel supply comprises a fuel outlet opening out at the side wall.

Preferably, the fuel evaporation surface can extend over at least 50% of the axial extension of the pre-mixing chamber, more preferred over at least 70%, even more preferred over at least 80%.

According to a further development, the first combustion air supply is formed such that the combustion air flow is supplied substantially parallel to the main flow direction with a tangential flow component. In this case it is particularly reliably ensured that the combustion air flow is guided over the fuel evaporation surface, that reliable evaporation takes place, and that a homogeneous fuel-combustion air-mixture is formed in the pre-mixing chamber.

According to a further development, the first combustion air supply opens out into the pre-mixing chamber at a face side of the pre-mixing chamber facing away from the combustion chamber. In this case, it is enabled that the combustion air is guided over the fuel evaporation surface over a relatively long distance in the main flow direction even if the burner arrangement has a compact construction in the axial direction. Preferably, the first combustion air supply opens out into the pre-mixing chamber at the face side in a radially outer region of the face side, such that an advantageous flow course of the generated fuel-combustion air-mixture develops up to the combustion chamber.

According to a further development, the fuel evaporation surface is formed by the side wall of the pre-mixing chamber. In this case, the burner arrangement has a particularly simple construction with a small number of components and fuel evaporation can take place starting from a fuel film which forms at the side wall of the pre-mixing chamber due to the combustion air being supplied with a swirl.

According to another further development, an evaporator body from an absorbent material is arranged in the pre-mixing chamber, which evaporator body provides the fuel evaporation surface. In this case, a large surface for evaporation can be provided in a simple manner. The evaporator body can preferably have a porous structure and can in particular comprise a metal non-woven fabric, a metal meshwork and/or a metal woven fabric. Preferably, the evaporator body rests against the side wall of the pre-mixing chamber in a flat manner.

According to a further development, the fuel outlet opens out in the region in which the evaporator body is arranged. In this case, the liquid fuel is reliably transferred to the evaporator body at the fuel outlet. The evaporator body can e.g. be arranged in such a manner that it covers the fuel outlet or (in the case of plural fuel outlets) the fuel outlets, respectively.

According to a further development, a second combustion air supply for supplying combustion air into the combustion chamber is formed downstream of the pre-mixing chamber. In this case, a portion of the combustion air is mixed with the fuel already in the pre-mixing chamber and further combustion air is supplied to the already conditioned fuel-combustion air-mixture in the combustion chamber. Combustion which is particularly low in emissions can be achieved in this manner.

According to a further development, the side wall of the pre-mixing chamber tapers in the main flow direction. In this case, the absolute/average flow velocity of the generated fuel-combustion air-mixture is increased towards the combustion chamber. The side wall of the pre-mixing chamber can in particular be formed as continuously tapering in the main flow direction, in a preferred realization conically tapering. Other realizations in which the pre-mixing chamber has a smaller overall cross-section at the transition to the combustion chamber as compared to the inlet region for the combustion air flow are however also possible.

Preferably, the first combustion air supply and the transition from the pre-mixing chamber to the combustion chamber are formed such that the fuel-combustion air-mixture is introduced into the combustion chamber with a tangential flow component such that a recirculation region in which gases flow opposite to the main flow direction forms behind the transition in a radially inner region at a longitudinal axis.

In particular, the first combustion air supply and the side wall of the pre-mixing chamber can be formed such that the fuel-combustion air-mixture enters into the combustion chamber with a swirl factor of at least 0.6. The swirl factor ($S_N$) is an integral value which defines the relation between tangential and axial momentum flow. In this case, a recirculation region is reliably formed.

The object is also solved by a method for operating a burner arrangement as described above, wherein the combustion air is supplied with such a high tangential flow component by the swirl body that a recirculation region forms in the combustion chamber in a radially inner region at a longitudinal axis. Advantageous further developments will become apparent from the dependent claims. By formation of the recirculation region, on the one hand reliable anchoring of the flame in the combustion chamber takes place for a large bandwidth of heating powers, i.e. a large bandwidth of fuel-combustion air-mass flows, and on the other hand also very good mixing of fuel and combustion air takes place such that combustion which is particularly low in emissions is provided for.

According to a further development, the combustion air is supplied in such a manner that—when passing from the pre-mixing chamber into the combustion chamber—the fuel-combustion air-mixture has a velocity which is higher than the maximum turbulent flame velocity at which a flame can still form. In this case it is reliably prevented that the flame can light-back from the combustion chamber into the pre-mixing chamber.

The object is also solved by a mobile heating device operated with liquid fuel having a burner arrangement as described above. The mobile heating device operated with liquid fuel achieves the advantages which have been described above with regard to the burner arrangement.

The object is also solved by use of a burner arrangement as described above in a mobile heater of a parking heater or auxiliary heater in a vehicle.

Further advantages and further developments will become apparent from the following description of embodiments with reference to the enclosed drawings.

FIRST EMBODIMENT

Figure 1:
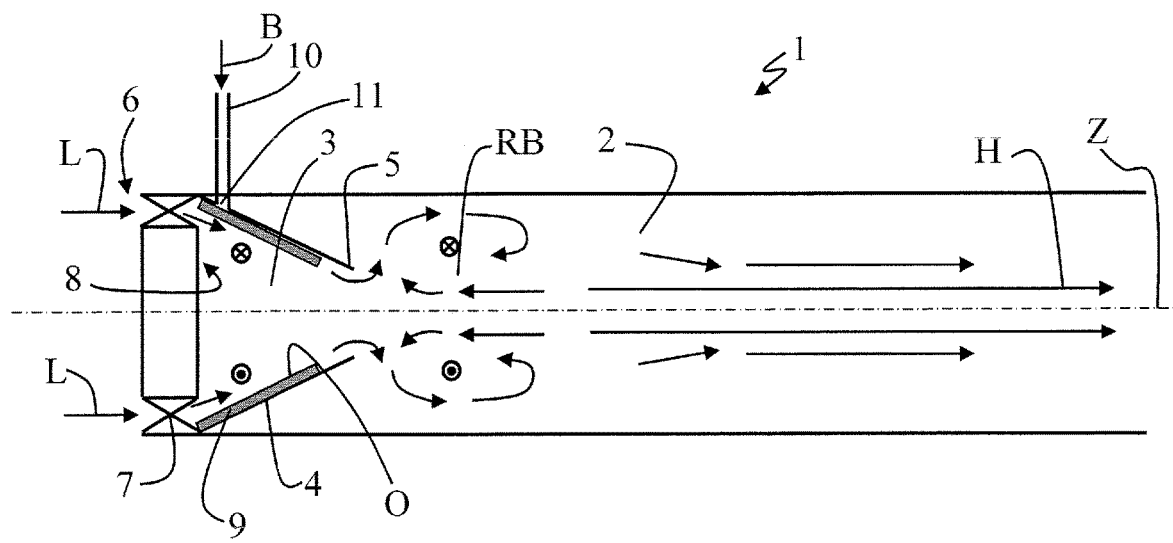
FIG. 1 is a schematic illustration of a burner arrangement according to a first embodiment.

A first embodiment will be described in the following with reference to FIG. 1.

In the embodiment, the burner arrangement 1 is designed for operation with a liquid fuel, such as benzine, diesel, ethanol, etc. as well as further additives, as the case may be, and in different compositional relations. The burner arrangement 1 is designed to be used in a mobile heater operated with liquid fuel, in particular in a parking heater or auxiliary heater in a vehicle. Only the burner arrangement is shown in FIG. 1 for simplification and further components, such as in particular a combustion air conveying device, which can e.g. be formed by a blower, a fuel conveying device, which can e.g. be formed by a fuel dosing pump, in particular a piston pump, and a control for controlling the mobile heater are not depicted in the drawing. The heat exchanger arrangement through which the hot combustion gases are guided downstream of the combustion chamber to transfer the generated heat to a medium to be heated is not shown either in FIG. 1. The heat exchanger arrangement can in particular be formed to transfer the heat directly to air as a medium to be heated or to transfer the heat to a liquid in a liquid circuit of a vehicle, in particular to engine coolant in an engine coolant circuit.

As can be seen in FIG. 1, the burner arrangement 1 comprises a combustion chamber 2 in which—during operation of the burner arrangement 1—conversion of a fuel-combustion air-mixture takes place in a flaming combustion thereby generating heat during, as will be described more in detail. In the embodiment, the combustion chamber 2 comprises a substantially cylindrical shape having a longitudinal axis Z. The combustion chamber 2 comprises a free flow cross-section, i.e. no components obstructing the gas flow within the combustion chamber 2 and which would protrude into the gas flow, such as baffles for flame stabilization or the like, are arranged in the combustion chamber 2. It is however e.g. possible that an ignition element, which can e.g. be formed by a glow plug, and potentially one or more temperature sensors are arranged as protruding into the combustion chamber 2. The hot gases generated by the combustion process flow in a main flow direction E1 from the combustion chamber 2 to a heat exchanger which is arranged fluidicly downstream of the combustion chamber 2.

A pre-mixing chamber 3 is arranged fluidicly upstream of the combustion chamber 2, in which pre-mixing chamber 3 the liquid fuel, which can be formed by e.g. diesel, biodiesel, benzine, ethanol, or the like, is evaporated and conditioned with combustion air to a fuel-combustion air-mixture. The pre-mixing chamber 3 and the combustion chamber 2 are arranged one after the other in the axial direction. The pre-mixing chamber 3 comprises a side wall 4 by which the pre-mixing chamber 3 is delimited in its radial extension. In the depicted embodiment, the side wall 4 increasingly tapers in the main flow direction H. In the specific embodiment, the side wall 4 even tapers continuously in the main flow direction H. Although a preferred embodiment is shown in FIG. 1 in which the side wall 4 tapers conically towards the combustion chamber 2, other realizations are also possible. It is e.g. also possible to form the pre-mixing chamber 3 such that its cross-section does not taper in the main flow direction H. The pre-mixing chamber 3 is arranged at least substantially coaxial to the combustion chamber 2.

At a transition from the pre-mixing chamber 3 to the combustion chamber 2, a neck portion 5 is formed at which the flow cross-section abruptly widens in the main flow direction H. In the depicted embodiment, the flow cross-section widens step-like from a first smaller cross-section at the downstream end of the pre-mixing chamber 3 to a larger second cross-section which corresponds to the inner cross-section of the combustion chamber 2. Although such a step-like change in cross-section is shown in FIG. 1, it is also possible that the cross-section does not change step-like but nevertheless strongly widens, in particular at least with an opening angle of ≥20°, preferably ≥40°, more preferably ≥60°, wherein the opening angle is defined with reference to the longitudinal axis Z.

Figure 3:
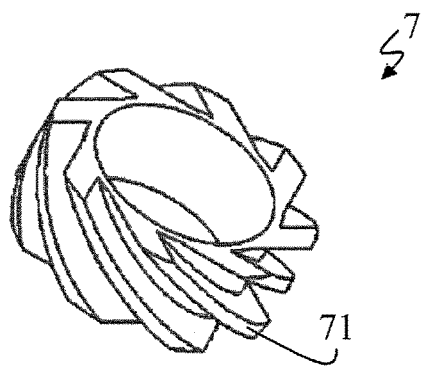
FIG. 3 is a schematic perspective illustration of a swirl body of the combustion air supply in the embodiments.

A first combustion air supply 6 is provided at which combustion air L is supplied to the pre-mixing chamber 3. The combustion air supply 6 can in particular comprise a blower which is not shown in the drawing for providing a combustion air mass flow. The combustion air supply 6 comprises a swirl body 7, which is schematically depicted in FIG. 1, formed to feed the combustion air into the pre-mixing chamber 3 with a flow component running in the tangential direction. The swirl body 7 can e.g. be provided with a plurality of air guiding vanes 71, as exemplarily shown in FIG. 3, in order to provide the supplied combustion air flow with the tangential directional component. The combustion air supply 6 is formed such that the combustion air supplied to the pre-mixing chamber 3 is supplied to the pre-mixing chamber 3 radially outside at the side wall 4. The swirl body 7 is formed such that the supplied combustion air is provided with a very strong swirl, in particular such that the combustion air entering into the combustion chamber 2 at the neck portion 5 has a swirl factor $S_N$ of at least 0.6.

The combustion air flow is supplied to the pre-mixing chamber 3 substantially parallel to the main flow direction H, but with the described high tangential flow component. The combustion air supply 6 is formed such that the combustion air is supplied to the pre-mixing chamber 3 at the face side 8 which faces away from the combustion chamber 2. Due to the described supply of the combustion air with a strong swirl, the combustion air flows along the side wall 4 towards the neck portion 5 in a manner rotating around the longitudinal axis Z.

As schematically depicted in FIG. 1, an absorbent evaporator body 9 is arranged at the side wall 4 of the pre-mixing chamber 3 in the first embodiment. The evaporator body 9 can comprise e.g. a metal non-woven fabric, a metal woven fabric, a metal meshwork and/or a porous ceramic body or the like. A fuel supply 10 is provided in order to supply liquid fuel B to the evaporator body 9. For this purpose, the fuel supply 10 is connected to a fuel conveying device, which is not shown, via which liquid fuel can be conveyed from a fuel reservoir to the evaporator body 9. Preferably, the fuel conveying device can be formed by a fuel dosing pump which both conveys and simultaneously meters the liquid fuel in the desired quantity. The evaporator body 9 rests against the side wall 4 of the pre-mixing chamber 3 in a planar manner and extends at least over a certain distance along the side wall 4. In the embodiment specifically illustrated in FIG. 1, in which the side wall has a conical shape, the evaporator body 9 also has a substantially conical shape with rotational symmetry about the longitudinal axis Z.

The fuel supply 10 comprises a fuel outlet 11 with opens out at the side wall 4 in a region in which the evaporator body 9 is located. The fuel outlet 11 opens out in a region which is covered by the evaporator body 9 such that the liquid fuel is passed over into the porous structure of the evaporator body 9. Although only one fuel outlet 11 is depicted in FIG. 1, a plurality of fuel outlets can also be provided. In particular, such a plurality of fuel outlets can be arranged distributed over the circumference of the side wall 4. Further, the fuel outlet or the fuel outlets, respectively, can be arranged to open out axially at the face side 8 of the pre-mixing chamber 3 facing away from the combustion chamber 2 into a region covered by the evaporator body 9. At the radially inner side, the evaporator body 9 comprises a fuel evaporation surface O at which evaporated fuel mixes with the combustion air sweeping along the side wall 4, thereby forming a fuel-combustion air-mixture. In the embodiment, the fuel evaporation surface O is exposed to the swirling air flow at least substantially over its whole axial extension. By the tangential flow component of the supplied combustion air, reliable evaporation of the fuel and mixing of the fuel-combustion air-mixture takes place. In operation of the heater arrangement, the heat energy needed for evaporation is achieved by heat back-feeding from the region of the combustion chamber 2, wherein heat back-feeding can take place via thermal conduction, thermal convection and/or thermal radiation. The well-mixed fuel-combustion air-mixture needed for the combustion process in the combustion chamber 2 is conditioned in the pre-mixing chamber 3 in this manner and the conditioned fuel-combustion air-mixture flows to the neck portion 5 at the transition from the pre-mixing chamber 3 into the combustion chamber 2 with the large tangential directional component.

Due to the strong swirl of the fuel-combustion air-mixture conditioned in the pre-mixing chamber 3 in combination with the abrupt widening of the flow cross-section at the neck portion 5, fluidically the neck portion 5 acts as a discontinuous widening of the cross-section such that a strong widening of the core swirl takes place in the swirling flow. Due to the resulting local static pressures, subsequent to the widening of the core swirl a collapse of the core swirl takes place such that a strong backwards flow opposite to the main flow direction H forms in a radially inner region close to the longitudinal axis Z, as schematically depicted by arrows in FIG. 1. With the described geometric construction of the burner arrangement 1, the recirculation swirls forming in this manner have a position which is substantially independent of the mass flow of the fuel-combustion air-mixture such that self-stabilization or anchoring of the flame takes place in the combustion chamber 2. Formation of these fluidic conditions can be explained by the swirling flow of the fuel-combustion air-mixture radially strongly widening after the neck portion 5, wherein a deceleration in the axial direction takes place. The tangential component of the velocity effects a radial pressure gradient whereby the static pressure decreases in the direction towards the longitudinal axis Z. Due to these pressure conditions, the recirculation region RB forms in which the gases flow opposite to the main flow direction H in the region close to the longitudinal axis Z.

An ignition element which is not shown is further provided in order to start the combustion process in the combustion chamber 2, with which ignition element the conversion process of the fuel-combustion air-mixture can be started. The ignition element can e.g. be formed in per se known manner by a glow plug or by a glow pin. The ignition element can in particular be arranged in a region between the side wall 4 of the pre-mixing chamber 3 and the outer wall of the combustion chamber 2.

In the embodiment, further the combustion air supply 6 and the pre-mixing chamber 3 are formed as adapted to each other such that a velocity of the conditioned fuel-combustion air-mixture develops at the neck portion 5 which is higher than the maximum turbulent flame velocity at which a flame can still form. In this manner, light-back of the flame from the combustion chamber 2 into the pre-mixing chamber 3 is reliably prevented.

SECOND EMBODIMENT

A second embodiment will be described in the following with reference to FIG. 2. The second embodiment differs from the first embodiment only in the kind of the combustion air supply to the combustion chamber 2 such that the same reference signs are used for the same components and that these components will not be described in detail again with regard to the second embodiment in order to avoid repeating.

The burner arrangement 101 according to the second embodiment differs from the above described first embodiment in that not the whole combustion air needed for the combustion process in the combustion chamber 2 is supplied via the first combustion air supply 6 and the pre-mixing chamber 3 into the combustion chamber 2, but also a second combustion air supply 12 is provided via which a portion of the needed combustion air is supplied to the combustion chamber 2.

Figure 2:
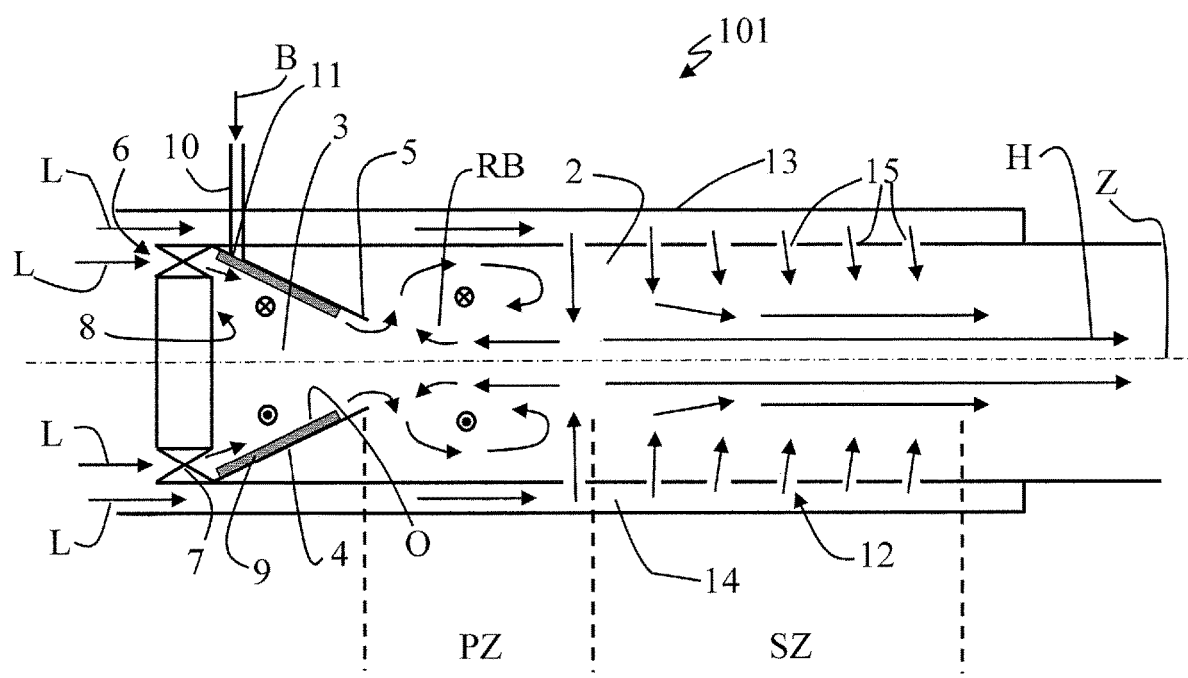
FIG. 2 is a schematic illustration of a burner arrangement according to a second embodiment.

As can be seen in FIG. 2, in the second embodiment the combustion air L supplied by a combustion air conveying device is split into a first combustion air flow which is supplied to the pre-mixing chamber 3 via the first combustion air supply 6 having the swirl body 7 and a second combustion air flow which is guided around the pre-mixing chamber 3 and is supplied to the combustion chamber 2 through air entry openings in the wall of the combustion chamber 2. To achieve this, in the depicted embodiment an outer body 13 is provided for this purpose which surrounds at least the upstream part of the combustion chamber 2 at the outer circumference thereof such that a ring space 14 is formed between the wall of the combustion chamber 2 an the outer body 13, through which ring space the second combustion air flow can stream. A plurality of air entry openings 15 is formed in the outer wall of the combustion chamber 2 via which the combustion air can flow from the ring space 14 into the combustion chamber 2, as schematically depicted by arrows in FIG. 2. The flow conduct for the combustion air is designed such that a desired relation of the apportionment of the first combustion air flow and the second combustion air flow results.

In operation of the burner arrangement 101 according to the second embodiment, as described before with reference to the first embodiment, the first combustion air flow enters into the pre-mixing chamber 3 with a strong swirl, forms there a fuel-combustion air-mixture with the supplied fuel, and thereafter enters into the combustion chamber 2 at the neck portion 5. In difference to the first embodiment, the combustion air mass flow which is guided through the pre-mixing chamber 3 is lower such that the fuel-combustion air-mixture conditioned in the pre-mixing chamber 3 is considerably fatter, i.e. comprises a larger relative fuel proportion. This fatter mixture enters into the combustion chamber 2 at the neck portion 5.

The combustion air supplied through the air entry openings 15 is supplied into the combustion chamber 2 from radially outside substantially in the radial direction. A portion of this combustion air, in particular from the air entry openings 15 arranged most upstream, reaches into a region close to the longitudinal axis Z and flows into the recirculation region RB in which it is mixed with the gases present there. Another portion of the combustion air of the second combustion air flow, in particular from the air entry openings 15 arranged further downstream, is supplied from radially outside to the hot combustion exhaust gases streaming off in the main flow direction H close to the longitudinal axis Z. In this manner, a primary combustion zone PZ in which a lower combustion air-to-fuel ratio exists forms in the region of the combustion chamber 2 in which the recirculation region RB is formed, and in the region further downstream of the combustion chamber 2 in which the hot combustion exhaust gases stream off in the main flow direction H a secondary combustion zone SZ forms in which a considerably higher combustion air-to-fuel ratio exists. In this manner, combustion which is particularly low in emissions is achieved, wherein a fast and almost complete conversion of the fuel with combustion air takes place in the primary combustion zone PZ at high temperatures such that CO emissions can be kept low. Furthermore, the primary combustion zone has a short length in the axial direction such that low NO emissions (nitrogen oxide emissions) are achieved. The secondary combustion zone SZ serves for complete fuel conversion, wherein the combustible contents which did not react in the primary combustion zone are converted.

THIRD EMBODIMENT

A third embodiment will be described in the following with reference to FIG. 4. The third embodiment illustrated in FIG. 4 differs from the above described second embodiment only in the manner in which fuel evaporation takes place. In order to avoid repeating, the components described with reference to the second embodiment are provided with the same reference signs and no detailed description of these components will be repeated.

In the burner arrangement 201 according to the third embodiment, no separate evaporator body from a porous material is provided, but the side wall 4 of the pre-mixing chamber 3 provides itself the fuel evaporation surface O. The fuel outlet 11 (or the fuel outlets in the case of plural such fuel outlets) opens out at the upstream side of the side wall 4, in particular at a position close to the face side 8. In operation of the burner arrangement 201, the liquid fuel exiting from the fuel outlet 11 is caught directly at the side wall 4 by the combustion air flow exiting from the swirl body 7. Due to the strong swirl of the combustion air flow, the liquid fuel is dispersed over the whole circumference on the side wall 4. The fuel is dispersed as a thin film on the side wall 4. By the side wall 4 tapering in the main flow direction H, it is guaranteed that fuel film remains reliably resting against the side wall 4. Starting from the thus-formed thin film, evaporation of the fuel and mixing-in into the combustion air, which sweeps along the surface of the fuel film due to the strong swirl, take place. The fuel evaporation surface O is thus formed by the side wall 4 of the pre-mixing chamber 3 in this case. Again, the fuel evaporation surface O is subjected to the swirling combustion air flow substantially over its whole axial extension. The burner arrangement 201 is overall designed such that evaporation of the fuel takes place in the film boiling domain such that residue-free evaporation of the fuel is achieved in the region of the pre-mixing chamber 3. Compared to the evaporation of liquid fuel on and in an evaporator body from porous material, which has been described with reference to the first and second embodiments above, very uniform and fuel distribution and fuel evaporation can be provided with the fuel evaporation surface O according to the third embodiment without elaborated constructional measures. In particular in the case of contaminations in the fuel, contrary to the first and second embodiments these contaminations cannot plug small cavities which are formed in a porous evaporator body.

Figure 4:
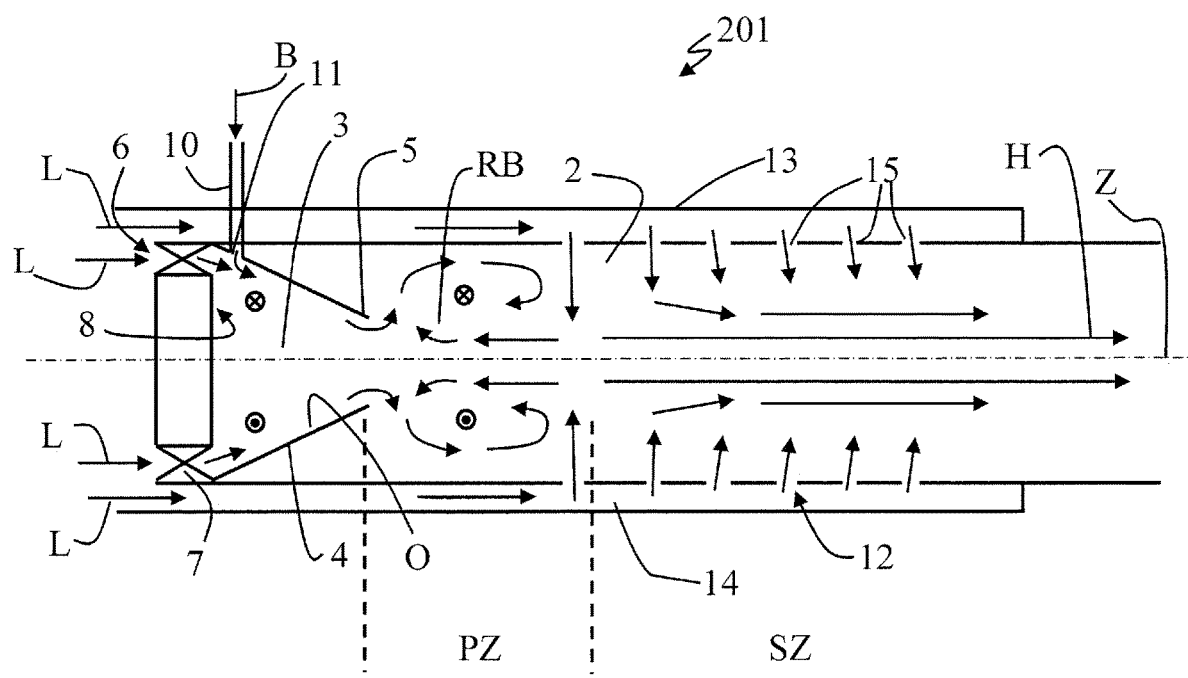
FIG. 4 is a schematic illustration of a burner arrangement according to a third embodiment.

Although a design of the burner arrangement is shown in FIG. 4 in which a second combustion air supply 12 is provided similar to the second embodiment, also the first embodiment can be adapted accordingly such that fuel evaporation takes place without separated evaporator body 9 at the side wall 4, as has been described with reference to the third embodiment. In this case, the design corresponds to the embodiment shown in FIG. 1, but without the evaporator body 9, and the fuel evaporation surface O is formed by the side wall 4.

The embodiments described with reference to FIGS. 1 to 4 all allow for a large band width of different heating powers (large spread of the heating power) and use of different liquid fuels. Further, high stability of the flame formed in the combustion chamber 2 and low pollutant emissions are achieved. In comparison to conventional burner arrangements, formation of deposits is reduced.

The invention claimed is:

1. A burner arrangement for a mobile heater operated with liquid fuel, said arrangement comprising:
    a combustion chamber converting fuel with combustion air in a flaming combustion, said combustion chamber extending along a longitudinal axis in a main flow direction;
    a pre-mixing chamber in which a flame does not form during regular heating operation, arranged upstream of the combustion chamber, formed separate from the combustion chamber and generating a fuel-combustion air-mixture, said pre-mixing chamber including a side wall tapering in the main flow direction;
    a fuel evaporation surface arranged in the pre-mixing chamber and provided by an absorbent material evaporator body being arranged in the pre-mixing chamber;
    a fuel supply supplying liquid fuel to said pre-mixing chamber; and
    a first combustion air supply having a swirl body and supplying a combustion air flow into the pre-mixing chamber with a swirl such that the combustion air is guided along the fuel evaporation surface with a tangential flow component, wherein a neck portion is formed at a transition from the pre-mixing chamber to the combustion chamber at which a flow cross-section abruptly widens in the main flow direction.

2. The burner arrangement according to claim 1, wherein the fuel evaporation surface extends over at least a portion of the side wall and the fuel supply includes a fuel outlet opening out at the side wall.

3. The burner arrangement according to claim 1, wherein the first combustion air supply is formed such that the combustion air flow is supplied substantially parallel to the main flow direction with a tangential flow component.

4. The burner arrangement according to claim 1, wherein the first combustion air supply opens out into the pre-mixing chamber at a face side of the pre-mixing chamber which faces away from the combustion chamber.

5. The burner arrangement according to claim 4, wherein the first combustion air supply opens out into the pre-mixing chamber at the face side in a radially outer region of the face side.

6. The burner arrangement according to claim 1, wherein the fuel outlet opens out in a region in which the evaporator body is arranged.

7. The burner arrangement according to claim 1, wherein the first combustion air supply and the transition from the pre-mixing chamber to the combustion chamber are formed such that the fuel-combustion air-mixture is introduced into the combustion chamber with a tangential flow component such that a recirculation region in which gases flow opposite to the main flow direction forms in the combustion chamber behind the transition in a radially inner region at a longitudinal axis.

8. The burner arrangement according to claim 1, wherein the first combustion air supply and the pre-mixing chamber are formed such that the fuel-combustion air-mixture enters into the combustion chamber with a swirl factor of at least 0.6.

9. The burner arrangement according to claim 1, wherein a second combustion air supply supplying combustion air into the combustion chamber is formed downstream of the pre-mixing chamber.

10. A mobile heater operated with liquid fuel having a burner arrangement according to claim 1.

* * * * *

UNITED STATES PATENT AND TRADEMARK OFFICE
CERTIFICATE OF CORRECTION

PATENT NO. : 10,823,397 B2
APPLICATION NO. : 14/907796
DATED : November 3, 2020
INVENTOR(S) : Volodymyr Ilchenko et al.

It is certified that error appears in the above-identified patent and that said Letters Patent is hereby corrected as shown below:

In the Specification

Column 5, Line 24, "direction E1 from" should be --direction H from--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*